(12) United States Patent
Sugimoto et al.

(10) Patent No.: US 7,717,550 B2
(45) Date of Patent: *May 18, 2010

(54) PRESERVATIVE SOLUTION

(75) Inventors: Junichiro Sugimoto, Toyoake (JP); Kazuma Goto, Nagoya (JP); Noriaki Satoh, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 395 days.

This patent is subject to a terminal disclaimer.

(21) Appl. No.: 11/610,497

(22) Filed: Dec. 13, 2006

(65) Prior Publication Data

US 2007/0137519 A1 Jun. 21, 2007

(30) Foreign Application Priority Data

Dec. 15, 2005 (JP) .............................. 2005-362296

(51) Int. Cl.
*G01D 11/00* (2006.01)

(52) U.S. Cl. ............................ 347/96; 347/95; 347/100

(58) Field of Classification Search ................. 347/100, 347/95, 96, 28, 30, 32, 33, 101; 106/31.13, 106/31.27, 31.6, 31.58; 523/160

See application file for complete search history.

(56) References Cited

U.S. PATENT DOCUMENTS

| 4,790,880 | A | * | 12/1988 | Miller | ........................ 347/100 |
|---|---|---|---|---|---|
| 5,748,208 | A | * | 5/1998 | Uchiyama et al. | ............. 347/43 |
| 5,825,380 | A | | 10/1998 | Ichizawa et al. | |
| 6,558,459 | B2 | * | 5/2003 | Schut | ...................... 106/31.58 |
| 2007/0153072 | A1 | * | 7/2007 | Goto et al. | .................. 347/100 |

FOREIGN PATENT DOCUMENTS

| JP | H01-148557 A | 6/1989 |
|---|---|---|
| JP | H09-039260 A | 10/1997 |
| JP | 2006-027003 A | 2/2006 |

* cited by examiner

*Primary Examiner*—Manish S Shah
(74) *Attorney, Agent, or Firm*—Baker Botts L.L.P.

(57) ABSTRACT

A preservative solution contains water, a water-soluble organic solvent and a crown ether. Even when the preservative solution is employed in the ink passage of an ink-jet recording apparatus and comes into contact with rubber members employed in the ink passage, the occurrence of precipitation is prevented.

14 Claims, No Drawings

PRESERVATIVE SOLUTION

BACKGROUND OF THE INVENTION

1. Field of the Invention

The present invention relates to a preservative solution employed in an ink-jet recording apparatus.

2. Description of the Related Art

In an ink-jet recording method, recording is performed by generating fine droplets of ink according to various ink ejection methods, causing them to fly, and allowing the ink to adhere to a recording material such as paper. In such a case, the ink droplets are generated by an ink ejection method such as: an electrostatic attraction method by means of the application of high voltage; a drop-on-demand method in which mechanical vibrations or displacements are applied to ink by use of a piezoelectric element; or a thermal method which utilizes the pressure generated when the ink is heated to generate a bubble. When using an ink-jet recording method, less noise is generated, and both high-speed printing and multi-color printing are possible.

When an ink-jet recording apparatus is shipped or is held in long-term storage, a preservative solution is filled into the ink passage of the ink-jet head, irrespective of the type of ink ejection method used. In this manner, ink can be smoothly introduced into the ink-jet head without causing bubbles to be caught in the ink at the time of ink introduction after shipping or long-term storage.

A water-based ink containing water as the main solvent has been widely employed as the ink employed in ink-jet recording apparatuses.

In an ink-jet recording apparatus, rubber members are employed in an ink passage comprising an ink tank and an ink-jet head. These rubber members include: a cap which covers the nozzles of the ink-jet head; a wiper which cleans nozzle surfaces of the ink-jet head; a packing seal which is placed at the joint portion between components; a tube which supplies ink from the ink tank to the ink-jet head if the ink tank is provided separately from the ink-jet head; and the like.

However, when a preservative solution or ink comes in contact with the rubber members, additives contained in the rubber members are dissolved in the preservative solution or the ink. The dissolved additives then precipitate out as insoluble materials, thereby causing problems such as clogging of nozzles of the ink-jet head. With regard to the above-mentioned problems for ink, a coloring agent exerts a chelating effect to trap components dissolved from the rubber members, whereby the precipitation of the insoluble materials is prevented to some extent. However, since a preservative solution does not contain a coloring agent, the problem of precipitation of the insoluble materials from the rubber members is more prevalent for the preservative solution.

In order to prevent clogging of the nozzles of an ink-jet head, various proposals have been made, such as: using a maintenance solution containing a chelating agent such as a polyaminocarboxylic acid; and cleaning an ink-jet head with a cleaning solution containing a chelating agent such as ethylenediaminetetraacetic acid.

However, even when the conventional maintenance solution or the conventional cleaning solution is employed, it is difficult to effectively prevent the occurrence of precipitation caused by contact of the preservative solution with the rubber members.

SUMMARY OF THE INVENTION

The present invention has been devised to solve the above problems. Accordingly, it is an object of the invention to prevent the occurrence of precipitation in an ink passage of an ink-jet recording apparatus even when a preservative solution comes in contact with rubber members in the ink passage.

The present inventors have found that, in order to achieve the above object, it is effective to add a crown ether to the preservative solution, and thus the present invention has been completed.

Accordingly, the present invention provides a preservative solution to be employed in an ink-jet recording apparatus in which rubber members are employed in an ink passage of an ink-jet head. The preservative solution is characterized by containing water, a water-soluble organic solvent and a crown ether.

The present invention further provides an ink-jet recording apparatus comprising an ink-jet head in which a rubber member is employed in an ink passage thereof and a preservative solution is filled in the ink passage. And the preservative solution comprises water, a water-soluble organic solvent and a crown ether.

The preservative solution of the present invention contains a crown ether. Therefore, even when the preservative solution comes into contact with rubber members in an ink passage of an ink-jet recording apparatus and causes additives to be dissolved from the rubber member into the preservative solution, the dissolved materials can be stably maintained in their dissolved state.

Therefore, problems such as the clogging of the nozzles of an ink-jet head do not arise, and ejection stability of ink is improved.

DETAILED DESCRIPTION OF THE PREFERRED EMBODIMENTS

The present invention will be described in detail as below.

The preservative solution of the present invention contains water, a water-soluble organic solvent and a crown ether. The crown ether is a characteristic component of the present invention and is added to the preservative solution in order to prevent the occurrence of precipitation caused by contact of the preservative solution with the rubber members in an ink passage of an ink-jet recording apparatus.

The crown ether is a cyclic ether having repeating ethylene oxide ($-CH_2CH_2O-$) units, and various types of crown ethers having different ring sizes and different modified groups are known. In the present invention, crown ethers of groups 1 to 4 described below are preferably employed. When the preservative solution comes into contact with rubber members, some components in the rubber members may be dissolved in the preservative solution. For example, such components include: ions originating from a vulcanization agent or a vulcanization accelerator, such as zinc ions, iron ions, copper ions and sodium ions; and ions originating from a lubricant, such as calcium ions, zinc ions, magnesium ions and lead ions. The above-mentioned crown ethers are preferable, because they reliably trap such components and thereby prevent the components from precipitating out of solution. A detailed description of the crown ethers may be found in references such as: C. J. Pedersen, Journal of American Chemical Society, Vol. 86 (2495), 7017-7036 (1967); G. W.

Gokel, S. H. Korzeniowski, "Macrocyclic polyether synthesis," Springer-Verlag. (1982); Oda, Shono and Tabuse (ed.), "Crown ether no kagaku (Chemistry of crown ether)," Kagaku Dojin (1978); Tabuse et al., "Host-Guest," Kyoritsu Shuppan (1979); and Sasaki and Koga, "Yuki Gosei Kagaku (Organic synthetic chemistry)," Vol. 45(6), 571-582 (1987).

Group 1:

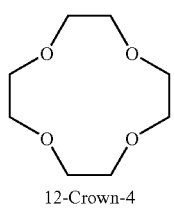

12-Crown-4

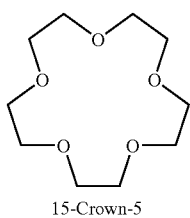

15-Crown-5

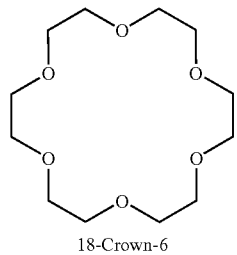

18-Crown-6

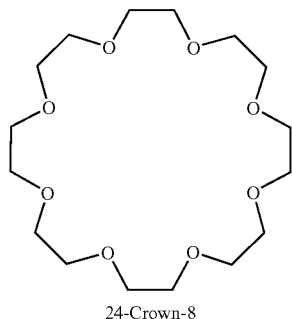

24-Crown-8

Group 2:

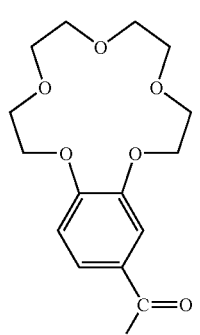

4′-Carboxybenzo-15-crown-5

-continued

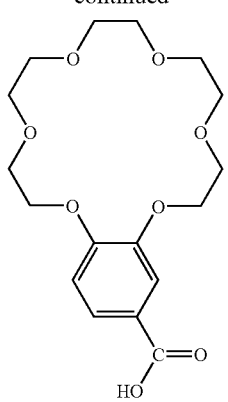

4′Carboxybenzo-18-crown-6

Group 3:

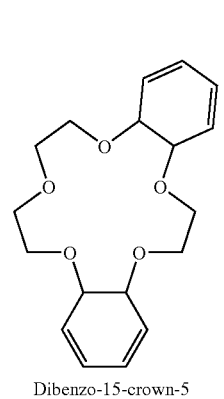

Dibenzo-15-crown-5

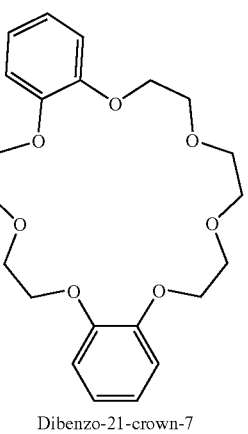

Dibenzo-21-crown-7

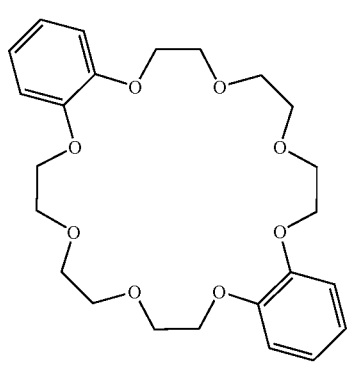

Dibenzo-24-crown-8

-continued

Group 4:

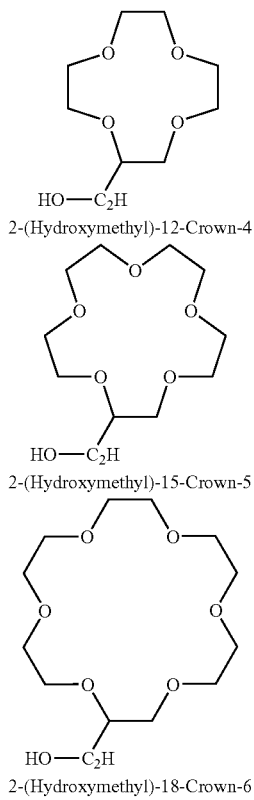

2-(Hydroxymethyl)-12-Crown-4

2-(Hydroxymethyl)-15-Crown-5

2-(Hydroxymethyl)-18-Crown-6

In the above examples, all heteroatoms constituting the crown ring are oxygen atoms. However, in the crown ethers employed in the present invention, the heteroatoms constituting the crown ring may include a nitrogen atom, a sulfur atom, a selenium atom and the like. These crown ethers may be employed alone or in a combination of two or more.

Among these crown ethers, a crown ether having a larger number of repeating ethylene oxide (—$CH_2CH_2O$—) units is preferable in terms of solubility. Furthermore, when the crown ethers have a substituent, the substituent is preferably a hydrophilic substituent. Preferred examples of the crown ether include, but not limited to, 18-crown-6,24-crown-8,4'-carboxybenzo-18-crown-6 and the like.

When the amount of the crown ether in the preservative solution is too small, the effect of the addition of the crown ether is not satisfactory. When the amount is too large, the crown ether and other components constituting the preservative solution do not dissolve easily in each other. Therefore, the amount of the crown ether is preferably in the range of about 0.1 wt. % to about 10 wt. % and more preferably in the range of about 0.1 wt. % to about 5 wt. %.

Preferably, deionized water or pure water is employed as the water constituting the preservative solution of the present invention. The preferred amount of water in the preservative solution is appropriately determined according to the characteristics required for the preservative solution. It is normally in the range of about 65 wt. % to about 95 wt. %.

Preferably, the water-soluble organic solvent constituting the preservative solution of the present invention is employed as a penetrant or a humectant. The penetrant improves the wettability with an ink passage and thereby improves those ability to introduce the preservative solution into the ink passage, and also enhances those ability to introduce the ink thereafter. The humectant prevents drying of the preservative solution and improves the solution stability of the preservative solution.

Preferably, a polyhydric alcohol alkyl ether which is capable of improving surface activity is employed as the penetrant. In contrast to a general surfactant such as polyoxyethylene nonylphenyl ether and the like, a mixture of the polyhydric alcohol alkyl ether and water has low foaming property and also has low surface tension. Therefore, the polyhydric alcohol alkyl ether effectively improves the wettability with the wall of the ink passage of an ink-jet head, whereby allowing gas-to-liquid replacement without leaving bubbles when the preservative solution is introduced into the ink passage. Furthermore, the polyhydric alcohol alkyl ether has low volatility. Therefore, even when water contained in the preservative solution is lost due to evaporation or the like, the polyhydric alcohol alkyl ether remains on the wall of the ink passage in the ink-jet head, thereby uniformly maintaining the wet state of the wall. Hence, when ink is introduced thereafter, the gas-to-liquid replacement need not be repeated on the wall of the ink passage in the ink-jet head, and thus the introduction of the ink may be facilitated.

Specific examples of the polyhydric alcohol alkyl ether include, but not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, triethylene glycol propyl ether, tripropylene glycol methyl ether, tripropylene glycol butyl ether and the like. These may be employed alone or as a mixture of two or more thereof.

Of these polyhydric alcohol alkyl ethers, a polyhydric alcohol alkyl ether having a vapor pressure at 20° C. of less than about 0.01 mmHg has low volatility and almost no specific odor of polyhydric alcohol alkyl ethers, and thus may be suitably employed. Examples of such a polyhydric alcohol alkyl ether include, but not limited to, triethylene glycol methyl ether, triethylene glycol butyl ether, tripropylene glycol butyl ether and the like.

Generally, the amount of the polyhydric alcohol alkyl ether in the preservative solution is preferably in the range of about 0.1 wt. % to about 30 wt. %, more preferably in the range of about 0.1 wt. % to about 10 wt. %, and most preferably in the range of about 0.5 wt. % to about 7 wt. %. When the amount of the polyhydric alcohol alkyl ether in the preservative solution is less than about 0.1 wt. %, the amount remaining on the wall of the ink passage of the ink-jet head is not sufficient, and thus the ability to introduce an ink thereafter are not sufficiently favorable. Furthermore, when the amount thereof exceeds about 30 wt. %, the viscosity of the preservative solution becomes high. Therefore, difficulty may arise in introducing the preservative solution into the ink passage by means of a purging apparatus.

Examples of the humectant include, but not limited to, polyalkylene glycols such as polyethylene glycol and the like; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentandiol, hexylene glycol and the like; glycerin; and pyrrolidones such as 2-pyrrolidone, N-methyl-2-pyrrolidone and the like. These may be employed alone or as a mixture of two or more thereof.

The amount of the humectant in the preservative solution is preferably in the range of 0 wt. % to about 30 wt. %. Furthermore, in order to suppress the viscosity rise in the preservative solution, and to provide favorable ability to introduce the introduction of the preservative solution into an ink passage, the total amount of the humectant and the penetrant with respect to the total amount of the preservative solution is preferably about 30 wt. % or less.

Generally employed additives such as a surfactant, a dispersing agent, a viscosity modifier, a surface tension modifier, a pH modifier and a preservative-mildewproofing agent may be added to the preservative solution of the present invention in accordance with need. In particular, an acetylene glycol-based surfactant represented by the formula below is preferably added as the surfactant, because this provides excellent ability to introduce the preservative solution. This acetylene glycol-based surfactant has high penetrability into the rubber member. Thus, when this surfactant comes into contact with the rubber member, materials causing precipitation, i.e., metal ions such as zinc ions are likely to be dissolved. However, because the preservative solution of the present invention contains a crown ether which traps the dissolved materials to stabilize the state of the solution, the occurrence of precipitation from the preservative solution may be prevented even in an aspect in which this acetylene glycol-based surfactant is contained:

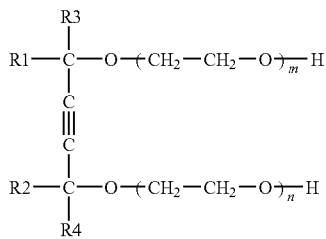

wherein R1, R2, R3 and R4 are independently a linear or branched alkyl group having 1 to 4 carbon atoms, and the sum of m and n is 0 to 50.

Examples of the commercially available acetylene glycol-based surfactant include, but not limited to, OLFINE® E1010 and E1004, SURFYNOL® 104E (all of which are a product of Nissin Chemical Industry Co., Ltd.) and the like.

The preservative solution of the present invention may be obtained by mixing the abovementioned components under stirring by means of conventional methods known to the skilled person.

Furthermore, the preservative solution of the present invention may be employed in a known ink-jet recording apparatus, and no limitation is imposed on the ink ejection method. The preservative solution may be employed in an ink-jet recording apparatus employing a thermal method, a piezo method or any other methods.

However, the preservative solution of the present invention is characterized in that the state of the solution is stably maintained even when a component originating from a rubber member is dissolved therein upon contact with the rubber member. Therefore, the preservative solution is valuable for use in an ink-jet recording apparatus in which a rubber member is employed in at least a part of the ink passage thereof.

In an ink-jet recording apparatus, rubber members employed in a part of the ink passage include: a cap which covers the nozzles of the ink-jet head; a wiper which cleans nozzles surfaces of the ink-jet head; a tube which supplies ink from an ink tank to the ink-jet head if the ink tank is provided separately from the ink-jet head; a packing seal which is an elastic member held between a buffer tank and a head unit, as disclosed in Japanese Patent Application Laid-Open No. 2006-27003; and the like. Generally, ethylene propylene diene rubber polymer (EPDM), isobutylene-isoprene rubber polymer (IIR), isoprene rubber polymer (IR), butadiene rubber polymer (BR), silicone rubber polymer (Q), chloroprene rubber polymer (CR) or the like is employed as the base polymer of these rubber members. However, when a rubber member is formed of ethylene propylene diene rubber polymer (EPDM), as represented by the formula below, the preservative solution of the present invention exhibits a significantly high stability in the solution state upon contact with the rubber member. Therefore, the preservative solution of the present invention may be particularly preferably employed in an ink-jet recording apparatus in which rubber members of an ink passage are formed of the ethylene propylene diene rubber polymer:

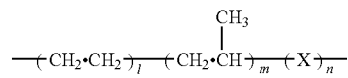

wherein X represents a non-conjugated diene compound such as ethylidene norbornene, dicyclopentadiene or 1,4-hexadiene.

A commercial product may be employed as the ethylene propylene diene rubber polymer (EPDM). Examples of the commercial ethylene propylene diene rubber polymer include, but not limited to, EP331 (product of JSR Corporation), ESPRENE® 505 (product of SUMITOMO CHEMICAL CO., Ltd.) and the like.

The present invention also embraces as another mode an ink-jet recording apparatus comprising an ink-jet head, as above-mentioned. The ink-jet head employs a rubber member in an ink passage thereof and the preservative solution is filled in the ink passage. The preservative solution comprises water, a water-soluble organic solvent and a crown ether.

EXAMPLES

The present invention will now be specifically described by way of examples, but the invention is not limited to these examples.

Examples 1 to 6 and Comparative Examples 1 and 2

(1) Preparation of Preservative Solutions

The preservative solutions of Examples 1 to 6 and Comparative Examples 1 and 2 were prepared with compositions shown in Table 1. Each of the preservative solutions was prepared by mixing all of the components under sufficient stirring, followed by filtration through a membrane filter of 0.8 μm.

TABLE 1

| | | Preservative solution | | | | | | | Comp. Ex. 1 | Comp. Ex. 2 |
|---|---|---|---|---|---|---|---|---|---|---|
| | | Ex. 1 | Ex. 2 | Ex. 3 | Ex. 4 | Ex. 5 | Ex. 6 | | | |
| Preservative solution composition (wt. %) | Water | 72.3 | 68.0 | 80.0 | 80.1 | 70.0 | 70.1 | | 70.7 | 76.0 |
| | Glycerin | 24.0 | 24.0 | 15.0 | 15.0 | 24.0 | 24.0 | | 24.0 | 24.0 |
| | Triethylene glycol-n-butyl ether | 3.0 | 3.0 | — | 3.0 | 5.0 | — | | 5.0 | — |
| | Dipropylene glycol-n-propyl ether | — | — | 1.5 | 0.9 | — | 0.9 | | — | — |
| | Tripropylene glycol-n-butyl ether | 0.5 | 0.5 | 0.5 | — | — | — | | — | — |
| | 18-Crown-6 | 0.2 | 4.5 | — | — | — | — | | — | — |
| | 24-Crown-8 | — | — | 3.0 | — | — | — | | — | — |
| | 4'-Carboxybenzo-18-crown-6 | — | — | — | 1.0 | — | — | | — | — |
| | Dibenzo-21-crown-7 | — | — | — | — | 0.5 | — | | — | — |
| | 2-(Hydroxymethyl)-15-crown-5 | — | — | — | — | — | 4.8 | | — | — |
| | OLFINE ® E1010 *1 | — | — | — | — | 0.5 | — | | 0.3 | — |
| | OLFINE ® E1004 *2 | — | — | — | — | — | 0.2 | | — | — |
| Evaluation | Evaluation of the ability to introduce ink | B | B | B | B | A | A | | A | C |
| | Evaluation rubber precipitation — Rubber sheet 1 | B | A | A | B | B | A | | D | D |
| | Evaluation rubber precipitation — Rubber sheet 2 | A | A | A | A | A | A | | D | D |

*1, *2: Acetylene glycol-based surfactant: product of Nissin Chemical Industry Co., Ltd.

(2) Evaluation (2-1) Evaluation of the Ability to Introduce Ink

Each of the preservative solutions was filled into ink cartridges intended for use in a digital multifunction device equipped with an ink-jet printer (MFC-5200J, product of Brother Industries, Ltd.), and the cartridges were inserted into the digital multifunction device. Subsequently, a maintenance operation was carried out for removing bubbles generated in an ink passage. Immediately after completion of the maintenance operation, ink cartridges (LC600BK, LC600Y, LC600M and LC600C, products of Brother Industries, Ltd.) were attached, into which respective inks had been filled. Then, the ratio of the number of nozzles having ejection failure to the total number of nozzles was determined at the initial ejection of each of the inks. The ratio was evaluated according to the following criteria. The results are shown in Table 1.

Criteria for the evaluation of the ability to introduce ink:

A: The ratio of the number of the ink ejectable nozzles at the initial ejection is 95% or more.

B: the ratio of the number of the ink ejectable nozzles at the initial ejection is 90% or more and less than 95%.

C: The ratio of the number of the ink ejectable nozzles at the initial ejection is less than 90%.

(2-2) Evaluation of Precipitation of Rubber

According to each of the rubber compositions shown in Table 2, all the materials were successively fed to a rubber mixer, kneaded, and then discharged therefrom. Each of the discharged mixtures was extruded into a sheet-like shape by means of a biaxial extruder and was then subjected to vulcanization molding (at 165° C. for 7 minutes), thereby obtaining a rubber sheet 1 (butyl rubber (IIR)) and a rubber sheet 2 (ethylene propylene diene rubber (EPDM)).

TABLE 2

(Unit: Parts by weight)

| | | Rubber sheet 1 | Rubber sheet 2 |
|---|---|---|---|
| Polymer | Ethylene propylene diene rubber polymer *1 | — | 100 |
| | Isoprene-isobutylene rubber polymer *2 | 100 | — |
| Vulcanization agent | Zinc oxide | 5 | 5 |
| | Dicumyl peroxide | — | 2.7 |
| Vulcanization accelerator | Tetramethylthiuram disulfide | 1.5 | — |
| Filler | Carbon black | 50 | 100 |
| Softening agent | Paraffin oil | — | 50 |
| Processing aid | Stearic acid | 1 | 1 |

*1: EP331, product of JSR Corporation
*2: HT-1066, product of JSR Corporation

Each of the obtained rubber sheets 1 and 2 was cut into dimensions of 50 mm length, 10 mm width and 2 mm thickness. One of the cut rubber sheets was immersed in 10 mL of the preservative solution in a sealed container and was left to stand for two weeks in a thermostatic bath at 60° C. Subsequently, the immersed rubber sheet was removed, and the preservative solution, after the removal of the immersed rubber sheet, was filtrated with an electroformed filter (having a pore size of 13 μm and an effective filtration area of 8 cm²) to measure the time required for the filtration. In addition, as a control, the preservative solutions in which the rubber sheet was not added were left to stand under the same conditions as above (at 60° C. for two weeks) and were filtrated with an electroformed filter having the same specification as above to determine the time required for the filtration (this provided a reference time). For each of the preservative solutions into which the rubber sheet was immersed, the percentage of the time required for the filtration to the reference time was determined and evaluated according to the following criteria. The results are shown in Table 1.

Criteria for the evaluation of precipitation of rubber:

A: The required filtration time is less than 130% of the reference time.

B: The required filtration time is at least 130% and less than 200% of the reference time.

C: The required filtration time is at least 200% and less than 400% of the reference time.

D: The required filtration time is at least 400% of the reference time.

The electroformed filters after the filtration were observed under a microscope, and it was found that the larger the ratio of the above-mentioned filtration time to the reference time, the higher the amount of precipitations.

As shown in Table 1, in the preservative solutions of Examples 1 to 6 containing the crown ether, the evaluation results of the precipitation of rubber were excellent for each of the rubber sheet 1 (IIR) and the rubber sheet 2 (EPDM). In particular, the evaluation results of precipitation were excellent for the rubber sheet 2.

On the other hand, in the preservative solutions of Comparative Examples 1 and 2 not containing the crown ether, the evaluation results of the precipitation of rubber were poor. In particular, in the preservative solution of Comparative Example 2, which does not even contain the acetylene glycol-based surfactant, the evaluation results of the ability to introduce ink were also poor.

The present invention may provide a useful preservative solution employed in an ink-jet recording apparatus having a rubber member in an ink passage.

The entire disclosure of the specification, summary and claims of Japanese Patent Application No. 2005-362296 filed Dec. 15, 2005 is hereby incorporated by reference.

What is claimed is:

1. A preservative solution to be employed in an ink-jet recording apparatus in which a rubber member is employed in an ink passage of an ink-jet head, wherein the preservative solution comprises water, a water-soluble organic solvent and a crown ether lacking a trapped cation.

2. The preservative solution according to claim 1, wherein a crown ring of the crown ether lacking a trapped cation includes a nitrogen atom, a sulfur atom or a selenium atom.

3. The preservative solution according to claim 1, wherein the crown ether lacking a trapped cation is at least one selected from the group consisting of 12-crown-4,15-crown-5,18-crown-6,24-crown-8,4'-carboxybenzo-15-crown-5,4'-carboxybenzo-18-crown-6, dibenzo-15-crown-5, dibenzo-21-crown-7, dibenzo-24-crown-8,2-(hydroxymethyl)-12-crown-4,2-(hydroxymethyl)-15-crown-5,2-(hydroxymethyl)-18-crown-6.

4. The preservative solution according to claim 1, wherein the crown ether lacking a trapped cation is at least one selected from the group consisting of 18-crown-6,24-crown-8 and 4'-carboxybenzo-18-crown-6.

5. The preservative solution according to claim 1, wherein the concentration of the crown ether lacking a trapped cation in the preservative solution is from about 0.1 wt. % to about 5 wt. %.

6. The preservative solution according to claim 1, wherein the water soluble organic solvent comprises polyhydric alcohol alkyl ether.

7. The preservative solution according to claim 6, wherein the polyhydric alcohol alkyl ether is at least one selected from the group consisting of diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, triethylene glycol propyl ether, tripropylene glycol methyl ether and tripropylene glycol butyl ether.

8. The preservative solution according to claim 6, wherein the polyhydric alcohol alkyl ether has a vapor pressure at 20° C. of less than about 0.01 mmHg.

9. The preservative solution according to claim 6, wherein the polyhydric alcohol alkyl ether is at least one selected from the group consisting of triethylene glycol methyl ether, triethylene glycol butyl ether and tripropylene glycol butyl ether.

10. The preservative solution according to claim 6, wherein the amount of the polyhydric alcohol alkyl ether in the preservative solution is in the range of about 0.1 wt. % to about 30 wt. %.

11. The preservative solution according to claim 6, wherein the amount of the polyhydric alcohol alkyl ether in the preservative solution is in the range of about 0.5 wt. % to about 7 wt. %.

12. The preservative solution according to claim 1, further comprising an acetylene glycol-based surfactant represented by the following formula:

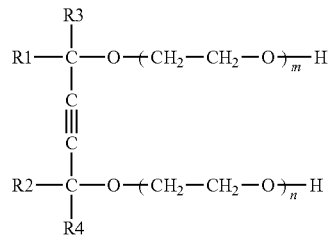

wherein R1, P2, R3 and R4 are independently an alkyl group having 1 to 4 carbon atoms, and the sum of m and n is 0 to 50.

13. The preservative solution according to claim 1, wherein the rubber member employed in a part of the ink passage of the ink-jet head comprises ethylene propylene diene rubber polymer.

14. An ink-jet recording apparatus comprising an ink-jet head in which a rubber member is employed in an ink passage thereof and a preservative solution is filled in the ink passage, wherein the preservative solution comprises water, a water-soluble organic solvent and a crown ether lacking a trapped cation.

* * * * *